Oct. 29, 1968  A. E. TRAVER  3,407,646
CIRCUIT FOR CONTROLLING ANALYSIS OF AUTOMOBILE EXHAUST GAS
Filed Oct. 4, 1965  3 Sheets-Sheet 1

INVENTOR.
ALFRED E. TRAVER

Oct. 29, 1968 A. E. TRAVER 3,407,646
CIRCUIT FOR CONTROLLING ANALYSIS OF AUTOMOBILE EXHAUST GAS
Filed Oct. 4, 1965 3 Sheets-Sheet 2
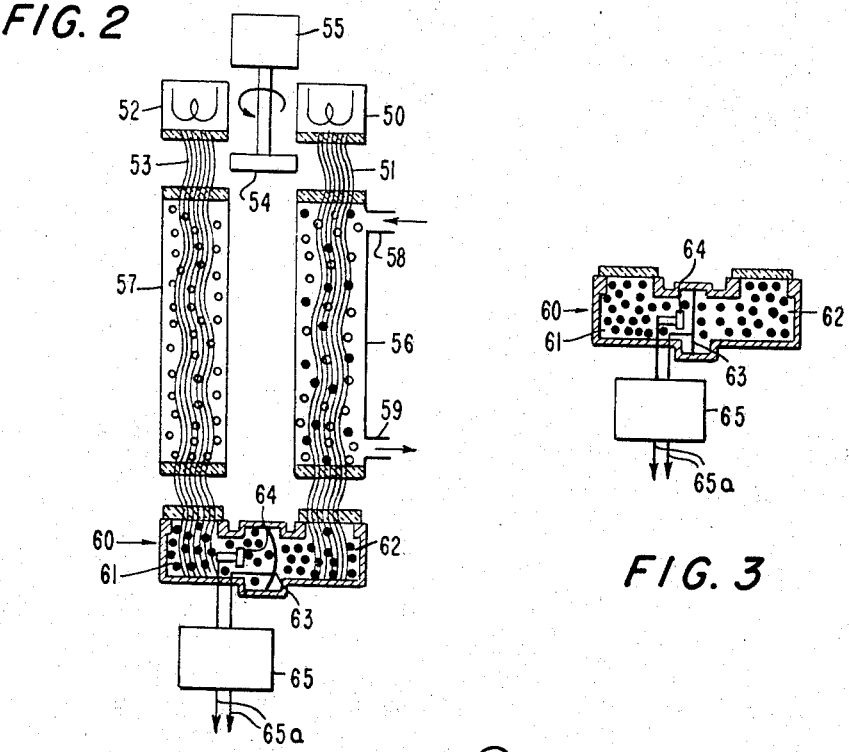
FIG. 2
FIG. 3
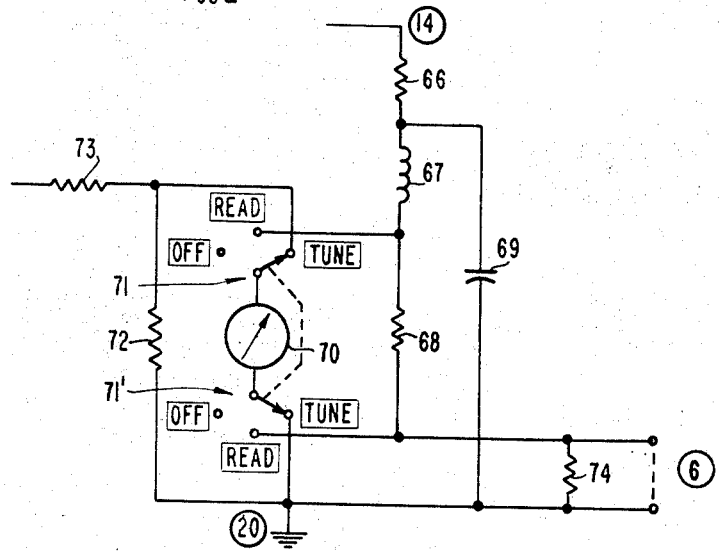
FIG. 4
INVENTOR.
ALFRED E. TRAVER Oct. 29, 1968    A. E. TRAVER    3,407,646
CIRCUIT FOR CONTROLLING ANALYSIS OF AUTOMOBILE EXHAUST GAS
Filed Oct. 4, 1965    3 Sheets-Sheet 3

INVENTOR.
ALFRED E. TRAVER 3,407,646
CIRCUIT FOR CONTROLLING ANALYSIS OF
AUTOMOBILE EXHAUST GAS
Alfred E. Traver, Great Neck, N.Y., assignor to Mobil Oil
Corporation, a corporation of New York
Filed Oct. 4, 1965, Ser. No. 492,462
8 Claims. (Cl. 73—23)

ABSTRACT OF THE DISCLOSURE

A circuit for automatically closing off the flow of a test gas to an analyzer system when the hydrocarbon content in the test gas exceeds a predetermined limit. There is also provided means for purging the system and for automatically initiating a timed flow of a reference gas to calibrate the system.

---

This invention relates to a test apparatus or system for measuring the hydrocarbon content of automobile exhaust gas.

More particularly, it relates to a test system employing an analyzer for the hydrocarbons in the exhaust gas, wherein provisions are made, in the event that the measured hydrocarbon content of the exhaust gas exceeds a predetermined limit, thus driving the analyzer meter off scale, for automatically closing off the flow of gas. Saturation of the system by hydrocarbons is thus avoided. There is also initiated a purge of the system, as by air, to save time in preparing for a subsequent measurement. Provision is also made, following the purge, for the automatic initiation of a timed flow of a reference gas, by means of which the calibration of the test system may be verified, after which an automatic purge is again instituted. These procedures, it should be noted, are conducted under conditions of actual use of the vehicle under test. Other objectives and advantages will become apparent from the ensuing description.

Measurement of the hydrocarbon content of the exhaust gas of an internal combustion engine is of significance in determining the condition of the engine. If the level of hydrocarbon is too high, it signifies a defective engine, and of course it shows that fuel is being wasted. The test is further significant because of legislative pressure in a number of areas to control the hydrocarbon content of exhaust emissions to predetermined levels.

As will be set forth in more detail, exhaust gas is passed to a conventional analyzer for the measurement of the hydrocarbon content. The analyzer, although conventional, is of a type in which the presence of hydrocarbon in the exhaust gas produces a small output current the magnitude of which is proportional to the hydrocarbon content. According to the invention, this small output current is then used to control a circuit in which a small current, comparable in magnitude to the said output current, may flow, which circuit in turn is used to control other circuits, and, finally, the flow of exhaust gas to the analyzer. The flow of air and reference gas to the analyzer are also controlled, and also the removal from the system of water trapped out from the reference gas.

The invention may be better understood by referring to the accompanying drawings, in which FIGURE 1 shows a combined flow and circuit diagram illustrating the passage of exhaust gas through test apparatus and the control of such flow, as well as the flow of other gases, by means of the associated circuit.

FIGURES 2 and 3 are simplified diagrams illustrating the flow of exhaust gas through the analyzer and the principle upon which it operates, together with the manner in which a signal is initially formed.

FIGURE 4 is a circuit diagram employed in the analyzer showing how the signal produced therein is applied through an output filter circuit to an indicating meter.

It should be understood that the showings of FIGURES 2, 3, and 4 represent conventional art and do not per se form a part of the invention. The showings are made because an understanding of them will be helpful to an understanding of the invention.

Figure 1:
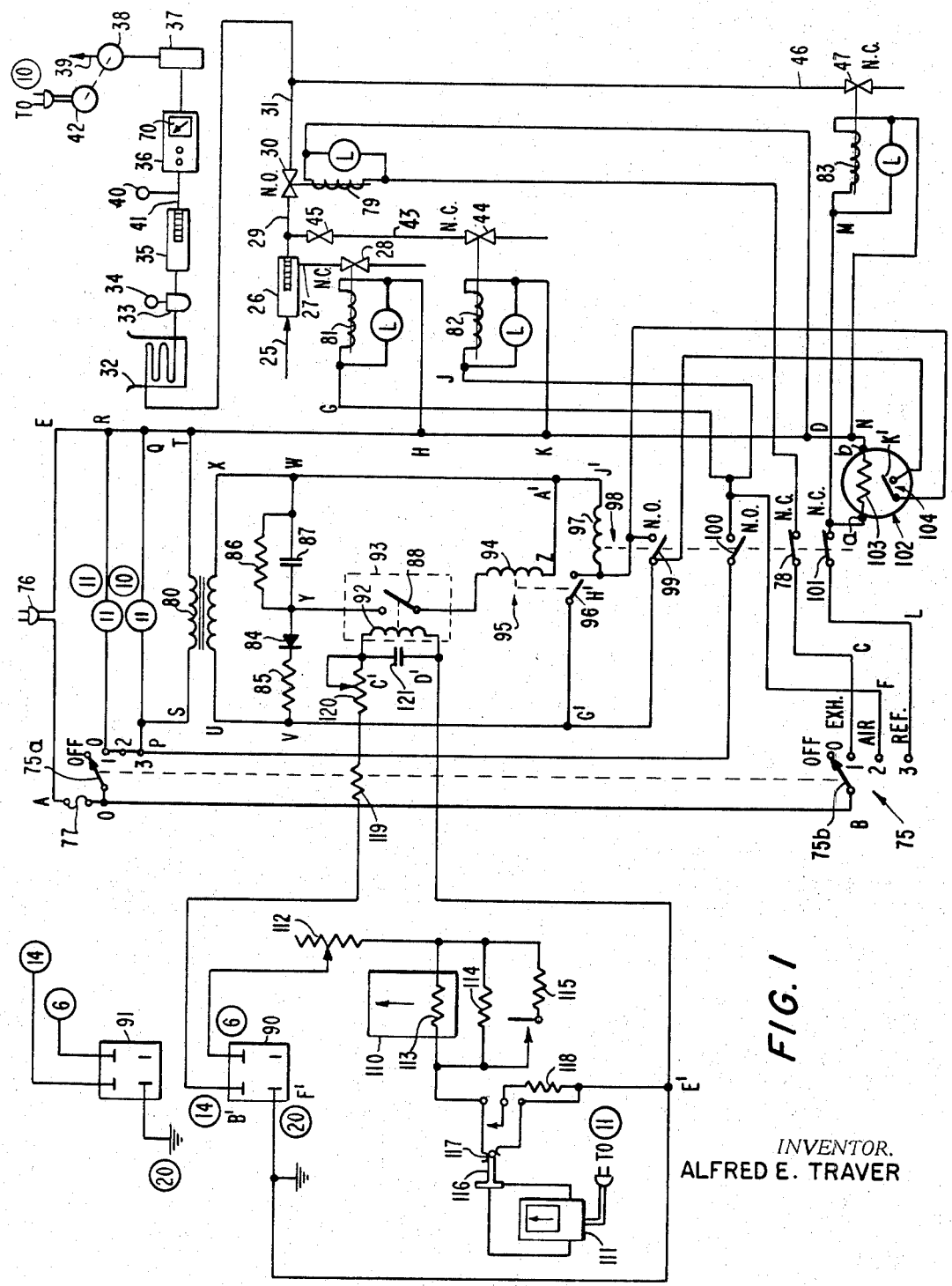

Considering FIGURE 1 first, and particularly the gas flow diagram on the right hand side thereof, exhaust gas from the tail pipe of a motor vehicle (not shown) flows through inlet pipe 25 into a coarse filter 26 which removes any large particles of soot or flakes of rust which may be present. The exhaust gas is warm and saturated with moisture, and some of the latter condenses in a portion of the filter and may be removed by line 27 and solenoid-controlled valve 28, as later described. The gas leaving the filter continues by line 29 through the normally open solenoid-controlled exhaust gas valve 30 and line 31 into condenser 32 where it is cooled to condense all or substantially all of the moisture. The mixture flows through the condenser 32 to condensate trap 33, in which a thermometer 34 is disposed, and here the water is removed so that the rest of the system will not become water-logged. The gas continues on to the fine filter 35 where fine soot and dust are removed after which the gas passes into the sample cell of the infrared analyzer 36, which will be discussed briefly below. The analyzer is equipped with a meter 70 which indicates the hydrocarbon concentration. After leaving the analyzer, the gas passes through a flow meter 37 and then is removed through vacuum pump 38 and discharged from the system by line 39. The vacuum pump serves to draw the gas through the entire system, and to help control its operation, a vacuum gage 40 is inserted in the gas inlet line 41 just ahead of the analyzer. Vacuum pump 39 is driven by electric motor 42 which plugs into a receptacle 10 in the circuit part of FIGURE 1.

Provision is made in the flow system for introducing air through line 43 which is controlled by normally closed solenoid valve 44 and by an equalizing, manually operated needle valve 45. Provision is also made for introducing reference gas to the system through line 46 which is controlled by a normally closed solenoid valve 47.

Analyzer 36 may be any suitable analyzer of hydrocarbon content which produces a small output current, say in the range of from just above 0 to about 5 ma. Suitably an infrared analyzer is used such as those designated IR–215, IR–315, and/or IR–415, made by Beckman Instruments, Inc. A brief description of the particular analyzer employed herein may now be given in connection with the discussion of FIGURES 2–4.

Considering FIGURES 2 and 3, these illustrate the principle of the analyzer and show how the presence of hydrocarbon in the exhaust gas gives rise to an output current of the kind described. The analysis of hydrocarbon is based on a differential measurement of the absorption of non-dispersed infrared energy. Hydrocarbons are suitably detected by this method because they absorb strongly in the infrared region. The analyzer comprises generally two sections, an analyzer section which is shown in FIGURE 2, and an amplifier control section (not shown). As shown in FIGURE 2, the analyzer section employs a double-beam optical system. Two series-connected infrared sources are shown, a source 50 for the sample energy beam 51 and a source 52 for the reference energy beam 53. Both beams are simultaneously blocked ten times per second by a rotatable chopper 54 comprising a two-segmented blade rotated by the motor 55. When the position of the chopper is as shown in FIGURE 2, i.e., with both beams unblocked, beam 51 passes through the sample cell 56 and beam 53 passes through reference cell 57. Sample cell 56 receives a continuous stream of exhaust gas through inlet 58, the gas leaving by exit 59. The solid dots in cell 56 represent hydrocarbons, and the open circles represent molecules of other types. On the other hand, reference cell 57 is a sealed tube, identical to the sample cell, but containing a reference gas, this being distinct from the reference gas flowing in line 46 of FIGURE 1. The gas in cell 57 does not contain hydrocarbons and does not absorb appreciable amounts of infrared radiation at those wave lengths which hydrocarbons do absorb. On the other hand, the gas flowing in line 46 contains hydrocarbons. It should be noted that the end pieces of cells 56 and 57 comprise quartz windows which transmit the infrared.

When the beams leave the two cells, the reference beam 53 carries more energy than beam 51 because an appreciable portion of the original energy of beam 51 was absorbed by the exhaust gas in cell 56, while very little of the energy of the reference beam 53 was absorbed by the reference gas. The difference between the two energy levels of the beams is a function of the concentration of the hydrocarbon in cell 56. Beneath cells 56 and 57 is a detector 60, comprising a closed container consisting of two sealed compartments 61 and 62, of equal volume separated by a flexible metal diaphragm 63. An infrared-transmitting window in each compartment permits entry of the corresponding beam. Both compartments are filled, to the same sub-atmospheric pressure, with the vapor of the hydrocarbons whose amount is to be measured. When the beams enter the detector 60, the gas in both samples is heated, causing the pressure in each to rise. As the gas in reference chamber 61 is heated to a greater extent than the gas in chamber 62, in consequence, the gas in 61 expands, distending the diaphragm 63 toward chamber 62, as shown.

When chopper 54 rotates to a position where it blocks the beams, the pressures in chambers 61 and 62 equalize, causing the diaphragm to return to its normal position, as shown in FIGURE 3.

As the chopper rotates, the diaphragm pulses. It constitutes one plate of a two-plate variable capacitor, the other plate being shown at 64 and comprising a stationary metal button mounted near the center of the diaphragm. The resulting variation in capacitance gives rise to a signal of a frequency of 10 c.p.s. and this is employed in oscillator unit 65 to modulate the amplitude of a 10-megacycle/second carrier wave provided by a crystal-controlled radio frequency oscillator (not shown). Additional electronic circuitry (not shown) demodulates the signal, providing half-wave rectification, and filters the resulting signal by means not shown to remove the high frequency component, leaving only a 10-c.p.s. signal. The latter is then removed from unit 65 by leads 65a and amplified and demodulated by means not shown to produce a DC pulsating signal, and this is applied through the output filter circuit of FIGURE 4 to the indicating meter 70.

FIGURE 4 shows a conventional output filter circuit through which the pulsating DC signal is applied to the meter 70. A maximum impedance of about 500 ohms is provided to give an output current in the range of from just above 0 to about 5 ma. The signal is applied across the terminals 14 and 20 so that an output current in the range described may pass through the meter. A three-position rotary switch 71, 71' is provided on each side of the meter, it being understood that 71 and 71' are mechanically connected, as indicated, and are movable together. In order to read the meter this switch is moved to "read." When the switch is turned to "tune," the meter indicates the operating level of the radio frequency demodulator (not shown). The reading shown by the meter when switch 71 is turned to "read," is a function of the hydrocarbon concentration in the exhaust gas. When the analyzer is placed in operation, it is adjusted so that a reading of 0 on the meter corresponds to a concentration of 0% hydrocarbon in the exhaust gas. A full scale meter reading corresponds to the highest hydrocarbon concentration desired for the range to be covered; suitably, this highest concentration may be 275 p.p.m. of hydrocarbon in the exhaust gas, this concentration coinciding with the upper limit permitted by some states. It will be understood of course that this predetermined limit may be selected as desired.

When the meter indicator is so high as to be off the scale, it is apparent that the hydrocarbon concentration is so high as not to be measurable, and that there is no point in continuing the flow of exhaust gas through the analyzer. As described, the invention provides for shutting off such flow, and it will be noted that such step also protects the meter by avoiding the continuous flow through it of maximum current.

In FIG. 4, a resistance 66 of 220 ohms and an inductance 67 of 4 henries are in series with meter 70 and, together with the capacitor 69 of 500 mfd., serve as a low pass filter for the current introduced to the meter. A resistance 68 of about 18 ohms across the meter helps to calibrate it. Between switch 71–71' and ground 20 a resistance 72 of 910 ohms is connected which helps to calibrate the meter to read the rectified current from the 10 megacycle oscillator (not shown) referred to above; a resistance 73 of 0.47 megohm is a part of the calibrating circuit for meter 70 when switch 71–71' is turned to "tune" and serves to limit the rectified current drain from the 10 megacycle oscillator. At 74 is a resistance of 74 ohms which provides an IR drop for operating the meter 110 and recorder 111 (note FIG. 1).

Considering the control circuitry of FIGURE 1, generally speaking this functions to interrupt the flow of current to the solenoid of exhaust gas valve 30 when the analyzer meter has an off scale "reading," indicating a hydrocarbon content in the exhaust gas which is in excess of a predetermined limit. This of course results in the closing of the valve 30 and stops the flow of exhaust gas through the analyzer, thus preventing the latter from becoming saturated by hydrocarbons. The closing of valve 30 is made to be responsive to the current flowing to the meter 70 of the analyzer, i.e., when this current reaches a maximum, it is used to actuate the first of a series of relays resulting in the closing of the valve 30. Coincidently with the closing of valve 30, the water drain valve 28 and the air valve 44 are opened to allow water to drain from filter 26 and air to enter and purge the system, after which these valves are closed preparatory to the introduction of further quantities of exhaust gas or to the introduction of reference gas.

In more detail, FIGURE 1 shows a first circuit which is energized by AC line current and which has a double pole multi-position rotary switch which is movable to include in the circuit all of the solenoid coils together with other circuit elements. The switch is identified as 75 and comprises an upper pole 75a and a lower pole 75b. As shown, each pole is movable to four positions identified as 0, 1, 2, and 3, these corresponding, at pole 75b, respectively to "OFF," "EXH" for exhaust gas, "AIR" for air purge, and "REF" for reference gas. At pole 75a corresponding contact positions are provided. Assuming that the swtich is at position 1, and that the plug 76 is connected to a 115-volt AC supply, the circuit may be identified by the letters AB–1CDEA, the circuit including a fuse 77, a closed armature 78, and a solenoid 79. The latter, also called a sucking solenoid, controls exhaust valve 30, and as shown, has a light connected across it to indicate whether or not it is energized. It will be noted that current also flows in a circuit identified as AOREA which contains a receptacle 11 into which there may be plugged the recorder motor, as later described. Another circuit which is energized is identified as AOPQEA, which has a receptacle 10 into which there may be plugged the motor 42 which drives vacuum pump 38. Another energized circuit is that identified as AOSTEA which contains means for reducing the line voltage in the form of an iron core step-down transformer 80. When switch 75 is moved to contact 2, solenoids 81 and 82 of water drain valve 28 and air valve 44, respectively, are energized to open these valves; and when the switch is moved to contact 3, solenoid 83 of reference gas valve 47 is energized to open this valve. For convenience, all of the foregoing circuits will be considered to comprise the earlier mentioned "first" circuit, all of them being supplied by AC line current and voltage.

In normal operation switch 75 is at contact 1, and with plug 76 connected to the power supply, solenoid 79 will be energized to open valve 30, vacuum pump 38 will draw exhaust gas through the analyzer 36, and the analyzer meter 70 will indicate the concentration of hydrocarbons in the gas. As long as such concentration does not exceed the predetermined limit, tests may be carried out comprising determining the hydrocarbon content of the exhaust gas at various throttle and operating conditions. It may be noted that the iron core step-down transformer 80 will be energized, providing a reduced voltage of about 24 volts AC in the secondary thereof. The circuit to which the transformer is coupled, identified as a "second" circuit or as UVWXU, serves to further reduce the voltage to a value of about 3 to 10 volts AC, suitably 7.5 volts, and has means to convert the curent to DC comprising diode 84 connected on one side to a 2000-ohm resistor 85 and on the other side to a parallel arrangement of a 1500-ohm resistor 86 and a capacitor 87 of 160 mfd. This latter circuit provides, at point Y, a small current of up to about 5 ma. at 7.5 volts. This current would flow in the associated circuit, identified as a "third" or low energy circuit or as YZA'WY, except that this circuit is open at 88.

At this point let it be assumed that the hydrocarbons in the exhaust gas exceed the predetermined limit so that the current flowing through meter 70 reaches a maximum and drives the meter indicator off scale. This current is small, being in the range of just above 0 to about 5 ma., in order to avoid damage to the meter. By means of the circuit identified as B'C'D'E'F'B', which may be designated as a "fourth" circuit or a current output circuit, and which is connected across the meter at point 14, 6, and 20, the small current flowing through the meter, also designated the output current, is employed to control the circuit identified as YZA'WY. Referring to circuit B'C'D'E'F'B', which is described below in more detail, this includes a receptacle 90 to which a plug 91 is connected having leads (14), (6), and (20), all of which are connected to the corresponding leads of the circuit in FIGURE 4. In this way, the small output current across meter 70 is made to flow in coil 92 of an electromagnetic forming part of a plug-in relay 93, the armature 88 of which comprises a switch for opening and closing the low energy circuit YZA'WY. It may be noted that coil 92 suitably has a resistance of about 1400 ohms.

In view of the small current flowing in coil 92, which may be up to 1 ma., but which as illustrated is about 0.17 ma. at 0.243 volt, the relay 93 is necessarily one of low energy, the armature 88 being required to be actuated by 0.243 volt in the coil 92. It is, of course advantageous to employ the low energy relay 93 because it takes only a small amount of energy from the analyzer meter circuit of FIGURE 4. Because of its sensitivity, DC current is required by relay 93. Upon actuation, the armature 88 closes the circuit in the low energy circuit YZA'WY, and in turn a sensitive coil 94 of 5,000 ohms resistance is energized. The current through coil 94 is about 1 ma. at 5 volts. This coil is part of a sensitive relay, indicated at 95, which includes the armature 96, which upon actuation completes a "fifth" or latching circuit, identified as UG'H'J'XU. The latter circuit contains a coil 97 of a still more powerful relay, indicated as 98, having associated with it the armatures 99, 100, 78 and 101. Unlike the sensitive relays 93 and 95, which operate on DC current, the multi-pole power relay 98 may operate on AC as well as DC current, and as shown, is supplied by 24-volt AC current flowing in the circuit UG'H'J'XU.

Considering the various armatures actuated by the power relay 98, the first result to be noted is that the normally closed armature 78 is opened. Bearing in mind that rotary switch 75 is closed at contact 1, the opening of armature 78 interrupts the current through solenoid 79, and in turn valve 30 closes to shut off the supply of exhaust gas to the analyzer. Another result, coincident with that just described, is that the normally open armatures 99 and 100 are closed. With switch 75 at the contact 1, the closing of armature 99 is of no pertinence to the invention; however, the closing of armature 100 results in the flow of AC line current to each of solenoids 81 and 82, as a result of which water drain valve 28 and air purge valve 44 open, the first to drain any water from filter 26 and the second to permit air to enter the system through line 43 and the open valve 45 in order to purge exhaust gas therefrom. Finally, in the case of the opening of normally closed armature 101, this event is of no pertinence to the invention as long as switch 75 is at contact 1.

After a suitable period of time, the duration of which may be determined readily by experiment, the test operator may bring the purging and draining steps to a halt by moving switch 75 to contact 0, a step which interrupts the flow of line current, and which of course interrupts the current through power relay 98, thus inactuating the armatures 99, 100, 78, and 101 so that they assume the positions shown. When the hydrocarbon content of the exhaust gas has fallen below the predetermined limit, a condition which the operator may determine by trial or by changing the throttle condition of the vehicle under test, the operator moves switch 75 to contact 1, and then may continue the testing of the vehicle, as described.

If, on moving switch 75 to contact 1, the analyzer meter still indicates the hydrocarbon to exceed the said limit, then the operator can interrupt the line current again by moving switch 75 to contact 0. This process can be repeated as often as necessary, and when the hydrocarbon content finally is below the limit, the analyzer system may be purged with air over a brief period and then set in operation on exhaust gas. The last-mentioned air purge may be carried out by moving switch 75 to contact 2, thus energizing solenoid 82 to open air valve 44 and let air move through the system. Solenoid 81 is also energized and opens drain valve 28, but solenoid 79 is not energized.

In order to calibrate meter 70 of the analyzer, a step which may be done from time to time, reference gas containing a known amount of hydrocarbon is passed through the system by moving switch 75 to contact 3, which completes a circuit, identified as AB-3LMNEA, in which there is included a solenoid 83 which controls reference gas valve 47. As a result, valve 47 opens to permit reference gas to be drawn through line 46 from a source not shown and passed through the system. Meanwhile, valves 28, 44, and 30 remain closed. In the last-identified circuit a time delay relay 102 is present comprising a heater coil 103 and a bi-metallic strip indicated as 104. As AC line current flows from terminal $a$ to terminal $b$ of the heater, the latter heats the bi-metallic strip, and after one minute the contact at K' closes and a circuit, identified as K'G'UXJ'K', is established which is energized by transformer 80 and of course by line current, and which includes the power coil 97. The energized multi-pole power relay 98 thus actuates armatures 99, 100, 78, and 101 as before. In particular, the normally closed armature 101 opens, resulting in de-energization of solenoid 83, thus closing valve 47 and shutting off the flow of reference gas. The armature 78 also opens but this is of no pertinence since switch 75 is at contact 3.

The armature 100 closes, and this completes the circuit which includes solenoids 81 and 82, thus opening valves 28 and 44 to permit water to drain and air to flow into the system. Armature 99 also closes, and this serves to keep the power relay 98 latched shut. It will be seen that the time delay relay 102 prevents waste of reference gas and also avoids passing two gases at once to the analyzer. With the opening of armature 101, current through heater coil 103 is interrupted, and as the latter cools, the contact at K' opens, but this does not kill power relay 98 as the latter is latched shut as described. In order to bring the air purge and water drain to a halt, the latching action of coil 97 is killed by moving switch 75 momentarily to contact 0, after which it may be turned to contact 2 for further air purging and then to contact 1 to resume the analysis of exhaust gas.

Turning now to the above-described fourth circuit which is connected across meter 70 of the analyzer and which is identified as B'C'D'E'F'B', this may include a meter 110, which is like the meter 70, and/or a recorder 111, comprising a single point strip chart device, both of which can indicate the hydrocarbon content of the exhaust gas. The meter of course indicates instantaneous values, while the recorder provides a record of all values, including the occasions when the meter is off scale. Between contact 6 of receptacle 90 and meter 110, a calibrating resistance 112 is inserted which by suitable adjustment will permit meter 110 to read the same as meter 70. The meter has a fixed internal resistance 113 of 1560 ohms, and in parallel with this is a resistance 114 of 2800 ohms for aid in calibrating the meter so that it reads in desired range of microamperes. The meter is removable from the circuit, in which case a resistance 115 having a value of about 999 ohms is cut into the circuit, and it will be understood that this resistance is cut out when the meter is in. Recorder 111 may be plugged into the circuit by means of the phone plug 116 and phone jack 117, shown connected. The recorder contains a resistance of 4600 ohms and permits a current of up to 100 microamperes to flow therethrough. The recorder motor is plugged into receptacle 11 of the circuit identified as AOREA. When the recorder is plugged in by means of the phone plug and jack connection, resistance 118, which has the same value as that contained in the recorder, is cut out of the circuit; and when the recorder is unplugged, this resistance is cut into the circuit automatically.

Circuit B'C'D'E'F'B' also contains a resistance 119 and a variable resistance 120, each of 5000 ohms, in series with the coil 92, and a high frequency by-pass capacitor 121 of 200 mfd. connected across the coil. By means of these resistances, particularly 120, the current through coil 92 may be adjusted to a value of 0.17 ma. and 0.243 volt, which has been found to be suitable to actuate armature 88.

Conventionally, the analyzer is provided with a meter 70 which indicates a range of 0 to 100 microamperes. This range can be made to reflect any suitable hydrocarbon range of concentration, in parts per million (p.p.m.), selected by the operator, such as 0 to 275 p.p.m., or 0 to 500 p.p.m., or 0 to 1000 p.p.m. For example, to indicate a hydrocarbon range of 0 to 1000 p.p.m., a reference gas containing 700 p.p.m. of hydrocarbon is passed through the analyzer, and the analyzer amplifier (not shown) is set so that the meter reads 70 microamperes on the reference gas and 0 on air. To indicate a hydrocarbon range of 0 to 5000 p.p.m., the amplifier is set so that the meter reads 14 microamperes on the 700 p.p.m. reference gas and 0 on air. It will be understood that the invention does not depend on the calibration of the meter.

It will be understood that meter 70 of the analyzer could be used in place of the meter 110, but the latter provides a measure of convenience in that it can be moved about in order to make it easy to see.

When the system is in operation and it is desired to verify the calibration of the meter and/or recorder, reference gas is passed through the analyzer. An adjustment is made, if necessary, in the analyzer amplifier (not shown) so that the meter correctly reads the hydrocarbon content of the reference gas in relation to the selected scale. This adjustment step is conventional and therefore not described. Similarly, during passage of air through the analyzer, the meter should read zero, and if not, it is made to do so by adjusting the amplifier as described by the manufacturer.

It may be noted that a single determination of the hydrocarbon content of exhaust gas, that is, a determination at a given throttle condition, can be made in a period of a few seconds, usually less than 10 seconds. In a cyclic test, where a number of determinations are made at varying conditions, the time will of course be longer.

It will be understood that the invention is applicable to the testing of any hydrocarbon-containing exhaust gas from any internal combustion engine. Also, other gases such as carbon monoxide and carbon dioxide, which are present in exhaust gas, may be detected and their concentrations measured; in these cases an analyzer is employed having a sample cell which detects and measures carbon monoxide or carbon dioxide as the case may be.

Figure 5:
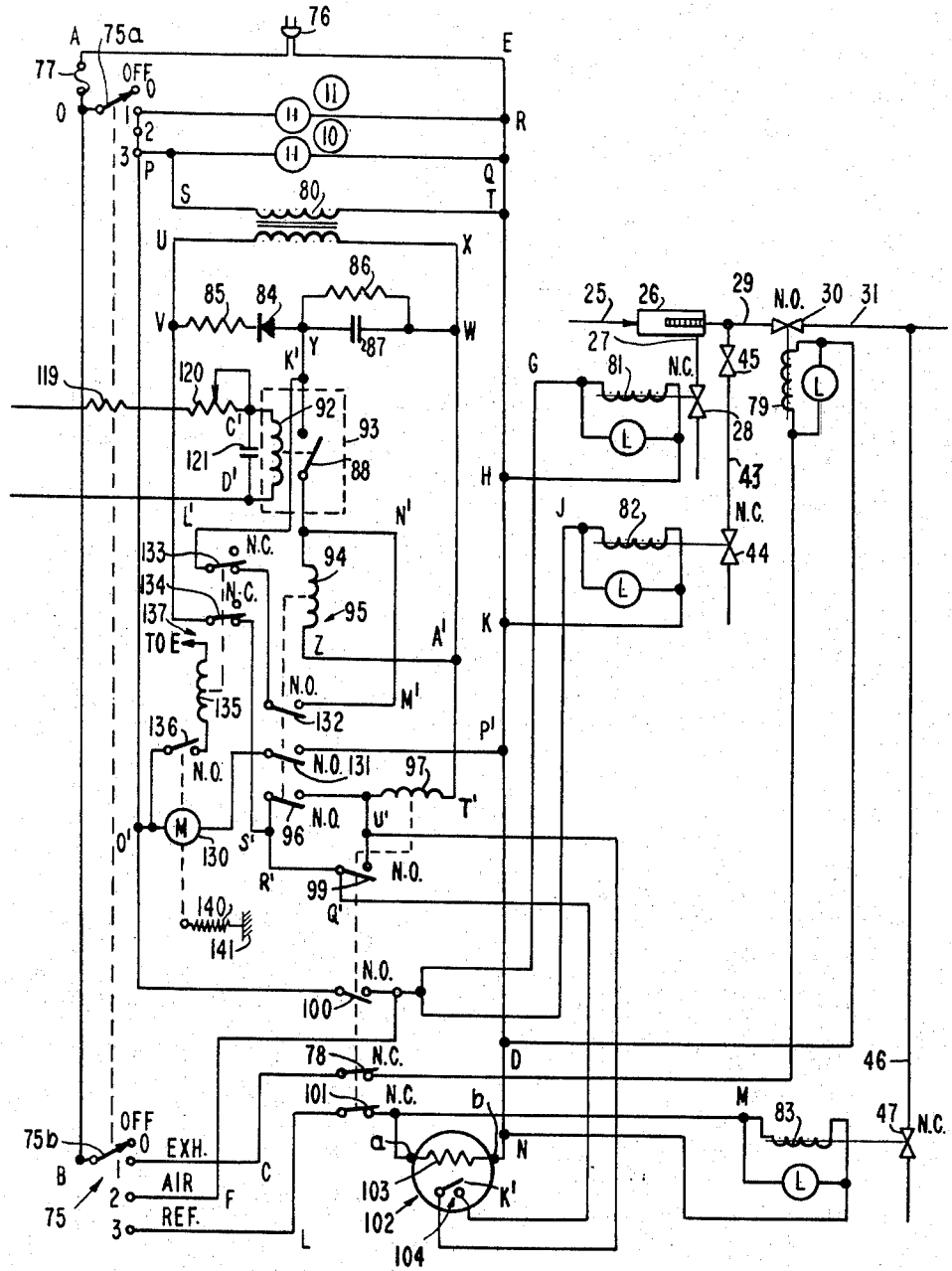
FIGURE 5 shows a modification.

In FIGURE 5 a modification of the invention is shown wherein means are provided for automatically timing the duration of the air purge and for automatically shutting off the purge at the close of the timed period. Much of the showing is the same as in FIG. 1, and therefore the same reference characters are used to refer to the same elements. Considering switch 75 to be at contact 1, exhaust gas will flow through the system, as described above. When an excessive amount of hydrocarbon is encountered in the exhaust gas, such as to drive meter 70 off scale, relay 93 will be energized so as to close armature 88, thereby energizing coil 94 of the relay 95. The energized coil 94 actuates the normally open armatures 96, 131, and 132 so that they close.

The closing of armature 132 forms a circuit in which the flow of current may by-pass armature 88 so long as armature 133 remains closed. This circuit may be identified as YK'L'M'N'ZA'WY, and is described further below.

Considering now the closing of armature 96, this results in energizing the coil 97, and in turn the actuation of the normally open armatures 99 and 100 and the normally closed armatures 78 and 101. With the opening of armature 78, the exhaust gas valve 30 closes to shut off the flow of exhaust gas; and with the closing of armature 100, the water drain and air valves 28 and 44, respectively, open to permit water to drain and air to purge the system. The foregoing events are described in detail in connection with FIG. 1. With the passage of air through the analyzer, meter 70 will read 0, no current will flow in coil 92, and the armature 88 will open. During the air purge, coil 94 will remain energized by virtue of the circuit identified as YK'L'M'N'ZA'WY.

The closing of armature 131 forms a circuit, identified as AOPO'P'EA, in which a reset delay timer 130 is energized. Timer 130 comprises a small motor which, for a suitably chosen period of time, stresses a small spring 140 connected to a wall 141. Timer 130 has a built-in double pole double throw relay which is shown in FIGURE 5. By means of a knob (not shown) time intervals may be set on the timer as desired, varying from a few seconds to several minutes. Assuming that a time period of 15 seconds is set, timer 130 will stress the spring 140 for 15 seconds, after which the normally open armature 136 is actuated to close, thereby energizing the coil 135 of a relay 137. As indicated, the output of coil 135 is to be regarded as leading to the point E, thus completing a circuit. The energized coil 135 actuates the normally closed armature 133 and 134 to open the same.

The opening of armature 133 results in de-energizing coil 94, and as a result the armatures 132, 131, and 96 reopen. The opening of armature 131 stops the motor of delay timer 130 and allows the spring 140 to return to its original start position.

The opening of armature 134 results in de-energizing coil 97, and in turn the armatures 99 and 100 are reopened and the armatures 78 and 101 are reclosed.

It will be seen that the air valve 44 remains open for the 15-second period to which timer 130 is set, and during this period the air purge takes place. At the end of the period, the sequence of events results in the opening of armature 100, thus de-energizing the air solenoid and closing the air valve.

With the exhaust gas valve 30 reopened, exhaust gas flows through the system for analysis, and if the hydrocarbon content thereof still exceeds the meter calibration, the foregoing sequence of events is repeated.

To calibrate the analyzer with reference gas, using the circuit of FIG. 5, switch 75b is turned to contact 3, resulting in energization of solenoid 83 by AC line current, as described. Heater coil 103 actuates the bimetallic strip 104, and the contact at K′ closes, establishing a circuit, identified as K′Q′R′S′UXT′U′K′. The latter circuit energizes power coil 97, which then actuates armatures 99, 100, 78, and 101, with the consequences described in connection with FIG. 1.

Although the various circuit elements shown are described as having more or less specific values, these values are illustrative and may be changed within appropriate limits.

It will be understood that the invention is capable of obvious variations without departing from its scope.

In the light of the foregoing description, the following is claimed.

1. In a system for determining the hydrocarbon content of automobile exhaust gas comprising an analyzer for said hydrocarbon content of the gas, said analyzer including an indicating meter supplied by a current output circuit in which a small output current flows, said output current increasing with increasing hydrocarbon content of the exhaust gas and being indicated by the meter, said current being a maximum in the range of just above zero to about 5 ma. when said hydrocarbon content exceeds a predetermined limit and said meter reading off scale at said maximum, a gas input line for supplying exhaust gas to said analyzer and an output line for removing the same, the improvement comprising means for closing off the flow of exhaust gas to the analyzer when said hydrocarbon content exceeds said limit, said means comprising a solenoid-controlled normally open exhaust gas valve in said gas input line, a first circuit energized by AC line current and having a multi-position switch which is movable to include in said first circuit the solenoid of said valve, a second circuit supplied by the first circuit for transforming said AC line current to DC current of reduced voltage and for supplying the same to a third circuit of low energy, a fourth circuit connected across said meter and energized by said small output current, means for coupling said fourth circuit and the low energy circuit and acting to energize the latter when said hydrocarbon content exceeds said limit, and de-energizing relay means energized by said low energy circuit for de-energizing the solenoid coil of the exhaust gas valve, thereby to close said valve and to shut off the flow of exhaust gas to said analyzer.

2. System according to claim 1 which includes means for calibrating said analyzer through use of a reference gas containing a known amount of hydrocarbon, said means comprising a reference gas conduit connected to said input line and having a solenoid-controlled normally closed reference gas valve therein, said multi-position switch in the first circuit being movable to switch in the solenoid of the reference gas valve, whereby energization of said first circuit serves to energize said reference gas solenoid, thereby to open the reference gas valve, a time delay relay energized by said first circuit at the same time as said reference gas solenoid and operative, after a predetermined time, to energize said de-energizing relay means, thereby to de-energize said solenoid of said reference gas valve and resulting in closing said reference gas valve.

3. In a system for determining the hydrocarbon content of exhaust gas comprising an analyzer for said hydrocarbon content of the gas, said analyzer including an indicating meter in which a small output current flows which is proportional to the hydrocarbon content of the exhaust gas and which is indicated by the meter, said current being a maximum in the range of just above zero to about 5 ma. and causing said meter to read off scale when said hydrocarbon content exceeds a predetermined limit, a gas input line for supplying exhaust gas to said analyzer and an output line for removing the same, the improvement comprising a solenoid-controlled normally open exhaust gas valve in said gas input line for closing off the flow of exhaust gas to the analyzer when said hydrocarbon content exceeds said limit, the solenoid of said valve being energized by AC line current, a low energy relay the solenoid of which is connected across said meter and is energized by said small output current, a low energy circuit including the armature of said relay, means for supplying to said log energy circuit a DC current of reduced value comparable in magnitude to the current through said meter, said maximum output current energizing said solenoid to actuate said armature, thereby to close and energize said low energy circuit, a sensitive relay energized by said low energy circuit, and a power relay energized by said sensitive relay and acting to de-energize the solenoid of the exhaust gas valve, thereby to close said valve and to shut off the flow of exhaust gas to said analyzer.

4. System according to claim 3 which includes means for calibrating said analyzer through use of a reference gas containing a known amount of hydrocarbon, said means comprising a reference gas conduit connected to said gas input line and having a solenoid-controlled normally closed reference gas valve therein, a switch for connecting the reference gas solenoid to said AC line current, thereby to energize said solenoid to open the reference gas valve, a time delay relay energized by said AC line current at the same time as said reference gas solenoid and operative, after a predetermined time, to energize said power relay, thereby to de-energize said reference gas solenoid and resulting in closing said reference gas valve.

5. System according to claim 3 which includes means for purging said analyzer through use of air, said means comprising an air conduit connected to said gas input line and having a solenoid-controlled normally closed air valve therein, said air valve solenoid being energized by said power relay and acting to open said air valve, a delay timer energized at the same time as said power relay and being operative, after a predetermined time, to de-energize said power relay, thereby to de-energize said air valve solenoid and resulting in closing said air valve.

6. In a system for determining the hydrocarbon content of exhaust gas comprising an analyzer for said hydrocarbon content of the gas, said analyzer including an indicating meter in which a small output DC current flows which is proportional to the hydrocarbon content of the exhaust gas and which is indicated by the meter, said current being a maximum in the range of just above zero to about 5 ma. and causing said meter to read off scale when said hydrocarbon content exceeds a predetermined limit, a gas input line for supplying exhaust gas to said analyzer and an output line for removing the same, the improvement comprising a solenoid-controlled normally open exhaust gas valve in said gas input line for closing off the flow of exhaust gas to the analyzer when said hydrocarbon content exceeds said limit, the solenoid of said valve being energized by AC line current, and a plurality of series-operable relays the first of which is energized by said small maximum DC current and which actuates a succeeding relay of higher power, and the last of which is actuated by a preceding relay and is energized by AC current, said last relay acting to de-energize the solenoid of the exhaust gas valve, thereby closing said valve and shutting off the flow of gas to the analyzer.

7. In a system for determining the hydrocarbon content of exhaust gas comprising an analyzer for said hydrocarbon content of the gas, said analyzer including an indicating meter in which a small output current flows which is proportional to the hydrocarbon content of the exhaust gas and which is indicated by the meter, said current being a maximum and causing said meter to read off scale when said hydrocarbon content exceeds a predetermined limit, a gas input line and an output line for said analyzer, the improvement comprising a solenoid-controlled normally open exhaust gas valve in said gas input line for closing off the flow of exhaust gas to the analyzer when said hydrocarbon content exceeds said limit, the solenoid of said valve being energized by AC line current, a low energy relay the solenoid of which is connected across said meter and is energized by said small output current, a low energy circuit including the armature of said relay, means for supplying to said low energy circuit a DC current of reduced value comparable in magnitude to the current through said meter, said maximum output current energizing said solenoid to actuate said armature, thereby to close and energize said low energy circuit, a sensitive relay energized by said low energy circuit, an AC current-operated power relay energized by said sensitive relay and acting to de-energize the solenoid of the exhaust gas valve, thereby to close said valve and to shut off the flow of exhaust gas to said analyzer, an air conduit connected to said gas input line and having a solenoid-controlled normally closed air valve therein adapted to open when energized to admit air, said air solenoid being energized by action of said power relay at the same time that the exhaust gas solenoid is de-energized, thereby to open said air valve to admit purging air to said analyzer.

8. System according to claim 7 which includes a delay timer energized by said sensitive relay at the same time as said power relay, said delay timer being operative, after a preedtermined time, to de-energize said power relay, thereby to de-energize said solenoid of said air valve and resulting in closing said air valve.

References Cited
UNITED STATES PATENTS

| | | | |
|---|---|---|---|
| 2,333,934 | 11/1943 | Jacobson | 73—23 |
| 2,508,588 | 5/1950 | Waltman | 73—27 |
| 2,955,457 | 10/1960 | Peters et al. | 73—23 |

RICHARD C. QUEISSER, *Primary Examiner.*

C. I. McCLELLAND, *Assistant Examiner.*